(No Model.) 3 Sheets—Sheet 1.
L. A. GREENE.
COTTON CHOPPER AND CULTIVATOR.
No. 465,261. Patented Dec. 15, 1891.
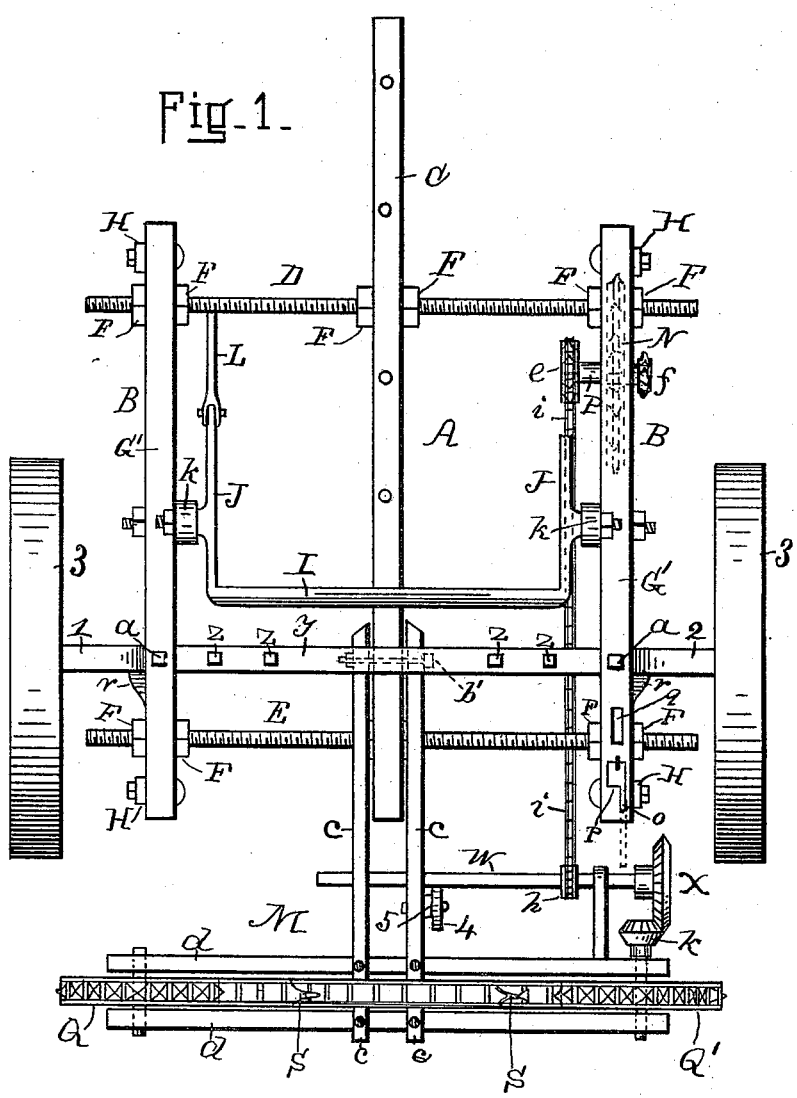
Witnesses
Thos. Houghton
John Lockie
Inventor
Lemuel A. Greene
Per Wm. R. Singleton
Attorney (No Model.)
3 Sheets—Sheet 2.
L. A. GREENE.
COTTON CHOPPER AND CULTIVATOR.
No. 465,261. Patented Dec. 15, 1891.
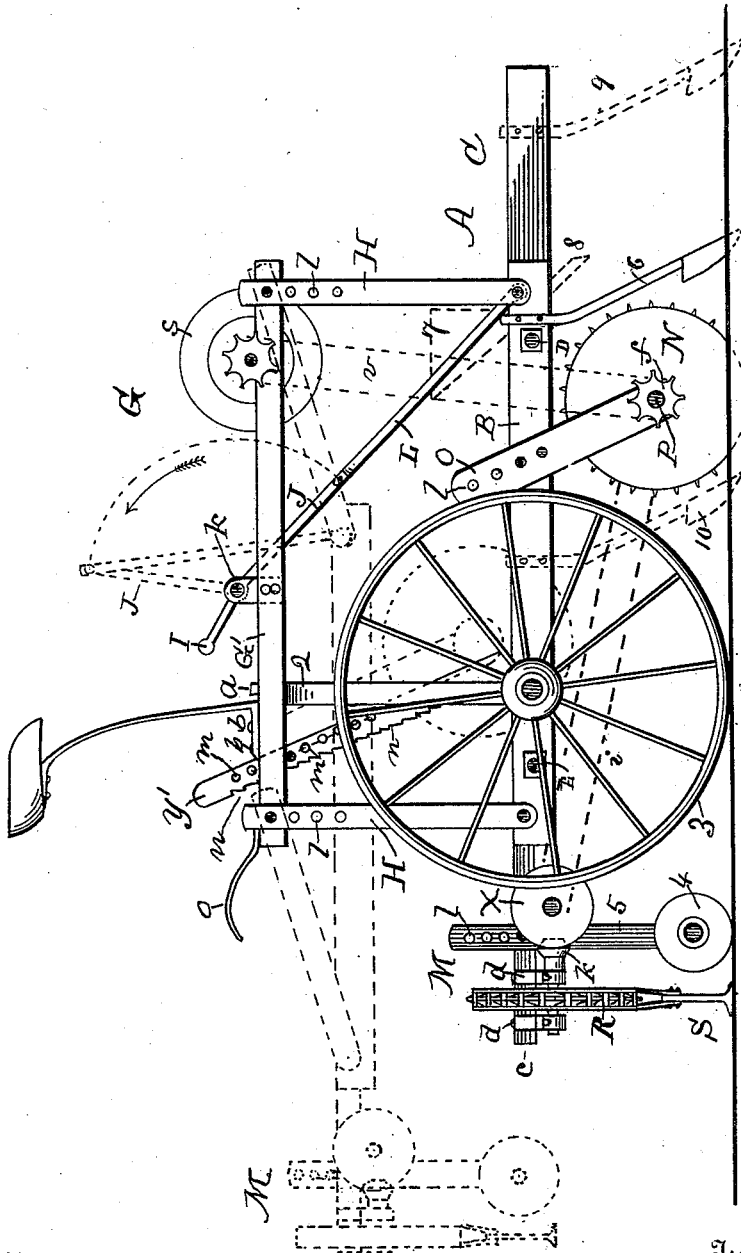
Witnesses
Thos. Houghton
John Lockie
Inventor
Lemuel A. Greene
Per Wm. R. Singleton
Attorney (No Model.) 3 Sheets—Sheet 3.
L. A. GREENE.
COTTON CHOPPER AND CULTIVATOR.
No. 465,261. Patented Dec. 15, 1891.
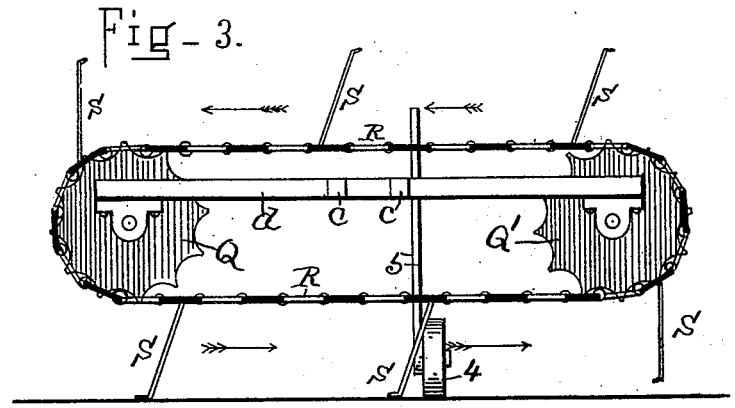
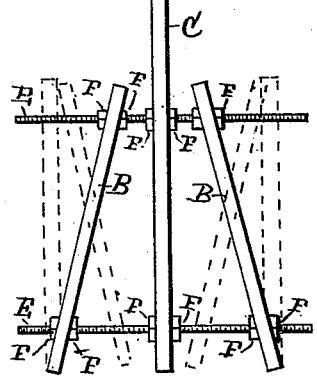
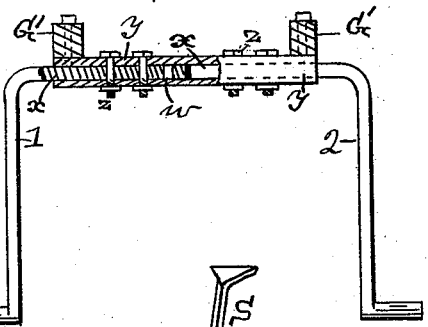
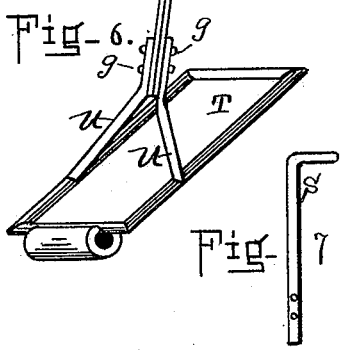
Witnesses
Thos. Houghton
John Lockie
Inventor
Lemuel A. Greene
Per Wm. R. Singleton
Attorney

UNITED STATES PATENT OFFICE.

LEMUEL A. GREENE, OF ARLINGTON, SOUTH CAROLINA.

COTTON CHOPPER AND CULTIVATOR.

SPECIFICATION forming part of Letters Patent No. 465,261, dated December 15, 1891.

Application filed July 11, 1891. Serial No. 399,110. (No model.)

*To all whom it may concern:*

Be it known that I, LEMUEL A. GREENE, a citizen of the United States, residing at Arlington, in the county of Spartanburg and State of South Carolina, have invented certain new and useful Improvements in Cotton Choppers and Cultivators; and I do hereby declare the following to be a full, clear, and exact description of the invention, such as will enable others skilled in the art to which it appertains to make and use the same.

My invention relates to that class of agricultural implements by which one machine is adapted to perform different kinds of work, thereby saving the cost of a separate machine for each kind of work. Its object is therefore the production of an efficient labor-saving machine for agriculturists by which the usefulness of several independent machines may be obtained at the cost of only one machine.

Figure 1 is a plan or top view of a machine embodying my invention, the driver's seat left off. Fig. 2 is a side elevation of the same, showing the machine in working position and in dotted lines the working parts lifted from the ground. Fig. 3 is an end view of the cotton chopper and its supports. Fig. 4 is a detail view of the adjustable main frame, showing its adjustability to three different positions. Fig. 5 is a side elevation, partly in section, of the axle, showing its construction. Fig. 6 is a perspective view of one sprocket-chain link with detachable cotton-chopper hoe in working position. Fig. 7 shows another form of cultivating implement. Fig. 8 is a side elevation of seed-planter or guano-distributer.

A represents the main frame, consisting of two similar side pieces B and a central piece C, to which the tongue and doubletree is attached in the usual well-known manner. Said main frame is held and firmly bound together by two bolts D E, near each end of the side beams B. Rods D and E are screw-threaded their entire length and carry screw-threaded nuts F, one on each side of the side beams and also of the center-beam, as shown in the drawings. By this construction the main frame is adapted to be changed in reference to its width and to the position of its side pieces, as shown in Fig. 4.

An upper or elevated frame G has its side pieces G G', Fig. 2, securely attached to the yoke $x$ of the axle by bolts $a$. At the rear of upper frame G the driver's seat is firmly secured by bolts $b$.

H H are side bars pivotally attached to and connecting the upper and the lower frames together. Said bars H are in pairs, two on each side and parallel one to the other, so as to permit the lower frame to be lifted clear of the ground, as shown in dotted line in Fig. 2, or of sinking the plow and driving mechanism to the working position shown in full line in same figure.

I is a treadle running across the upper frame immediately in front of the driver's seat.

J J are two levers, one end of each being securely fastened to the treadle I. Levers J J are pivoted to stands K, attached to the driver's platform. The opposite or lower ends of levers J are pivotally attached to the bifurcated end of a rod L, whose lower end is pivoted near the front end of the main frame. By this construction the driver is enabled to raise the entire working parts of the machine above the ground when going to or from the field.

M is a cotton-chopper frame removably attached to main frame A by a bolt $b'$, and consists of two longitudinal strips $c$ $c$ and two cross-bars $d$ $d$, between which the cotton-chopping hoes or cultivators are worked.

N is a propelling-wheel placed immediately under (in this case) the right side beam B and is supported by hanger O. Wheel N carries a short shaft P, to which are attached an inner and an outer sprocket-wheel $e$ and $f$.

The rear frame M has two sprocket-wheels Q Q', connected by a sprocket-chain R, which carries the cotton-chopper hoes S. Some of the links T of said chain have side holders U, cast integrally with the link, between which are secured the hoes or cultivators S by pins $g$ $g$.

W is a shaft journaled to frame M, as shown in Fig. 1, and carries a sprocket-wheel $h$, which is in line with sprocket-wheel $e$ at the forward end of the machine. Said wheels $e$ and $h$ are connected by a chain $i$.

X is a bevel-wheel secured to the outer end of shaft W and drives a pinion $k$, secured to shaft of sprocket-wheel Q'. Parallel bars H H and other parts are made adjustable by means of holes $l$ at their upper ends, in the well-known manner.

Y' is a supporting-bar and gage to set the machine or limit it to any required depth of cut. Gage Y' is provided with holes $m$ and teeth or serrations $n$ and a detent $o$, having an offset $p$ to engage with serrations $n$ to hold the lower frame at any desired elevation or depression.

$q$ is an aperture in beam G, through which gage Y passes. $r$ are stops on sides of main frame to limit its forward motion.

$s$ is a cylindrical revolving seed-dropper and distributer, having openings $t$ and covers $u$ to limit the quantity of seed sown. It is driven by sprocket-chain $v$ from sprocket-wheel $f$, as shown in Fig. 2.

7 is a funnel, (shown in dotted lines,) having a spout 8, through which seed or guano is distributed in the channel made by plow 9. (Shown in dotted lines.)

10 is a covering-plow (shown in dotted lines) placed in rear of funnel 7. There are usually two covering-plows used, a right and a left hand one, so as to insure the perfect covering of the seed.

The axle is made in two equal parts 1 and 2, having holes $w$ through its upper horizontal part $x$ to register similar holes in the horizontal hollow bar $y$, and to which it is secured by bolts $z$.

3 are the driving-wheels.

4 is a small wheel pivoted to bar 5 on the frame M to support the cotton-chopper and to gage the depth of the choppers.

6 is a plow secured to side beam B so as to cut a channel directly under said beam and in front of wheel N. The driving-wheel N runs into said channel, thereby guiding the machine steadily without lateral movement.

From the above description it will be seen that the machine may be used as a cotton-chopper of improved construction, and as such it is shown in working position in Fig. 2. In same figure in dotted lines is shown the elevation of the main frame with the mechanism attached thereto, which is done when the machine is in transit from field to field.

As a cultivator of corn or other crops the frame M and wheel N may be removed and cultivator-plows secured to the main frame in any order desired; also, if desired, the frame may be adjusted as shown in Fig. 4 and harrow-teeth attached thereto or cultivator-plows. As a seed-sower or guano-distributer it is equally available. The rear end of the frame M may be set at any other than a right angle to the main frame without departing from the spirit of my invention.

I do not confine myself to the number of hoes carried by chain R. Each link T may be made with holders U, if desired.

What I claim as new, and desire to secure by Letters Patent, is—

1. A cotton-chopper consisting of an upper frame supported on a yoke-axle, a lower frame connected thereto by parallel bars and carrying at its rear end a cotton-chopper frame pivotally connected thereto, a rear supporting-bar provided with a wheel to run over the ground, a sprocket-chain carrying hoes across the row of cotton, and a driving mechanism therefor, as herein shown and set forth.

2. In a cotton-chopper, the sprocket-chain links provided with supports $u$ $u$, united at their outer ends by a screw-bolt, which also secures between the ends of the supports a cutter-blade, substantially as and for the purpose described.

In testimony whereof I affix my signature in presence of two witnesses.

LEMUEL A. GREENE.

Witnesses:
ELIHU WILDER,
FRANK BURGISS.